US007010678B2

(12) United States Patent
O'Shea et al.

(10) Patent No.: US 7,010,678 B2
(45) Date of Patent: *Mar. 7, 2006

(54) BOOTSTRAP PROCESSOR ELECTION MECHANISM ON MULTIPLE CLUSTER BUS SYSTEMS

(75) Inventors: David J. O'Shea, Costa Mesa, CA (US); Bruce C. Edmonds, Jr., Colombia, SC (US); Craig W. Keating, Trabuco Canyon, CA (US); Larry D. Aaron, Jr., Irmo, SC (US); Frank E. LeClerg, Hillsborough, OR (US); Frank Binns, Hillsborough, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/384,444

(22) Filed: Mar. 6, 2003

(65) Prior Publication Data

US 2003/0145194 A1 Jul. 31, 2003

Related U.S. Application Data

(63) Continuation of application No. 09/474,781, filed on Dec. 30, 1999, now Pat. No. 6,611,911.

(51) Int. Cl.
*G06F 15/177* (2006.01)

(52) U.S. Cl. ........................................ 713/1; 713/2

(58) Field of Classification Search .................... 713/1, 713/2; 711/120, 151, 145; 710/112

See application file for complete search history.

(56) References Cited

U.S. PATENT DOCUMENTS

| | | | | |
|---|---|---|---|---|
| 5,247,659 A * | 9/1993 | Curran et al. | .................. | 713/1 |
| 5,265,235 A * | 11/1993 | Sindhu et al. | ............. | 711/120 |
| 5,615,374 A * | 3/1997 | Sadoi et al. | ................ | 710/200 |
| 5,642,506 A * | 6/1997 | Lee | .............................. | 713/1 |
| 5,659,748 A * | 8/1997 | Kennedy | ...................... | 713/2 |
| 5,673,388 A | 9/1997 | Murthi et al. | | |
| 5,724,527 A | 3/1998 | Karnik et al. | | |
| 5,764,882 A | 6/1998 | Shingo | | |

(Continued)

FOREIGN PATENT DOCUMENTS

JP 05-233561 * 9/1993

OTHER PUBLICATIONS

Yi Pan et al., "A Fault-Tolerant Protocol for Election in Chordal-Ring Networks with Fail-Stop Processor Failures", IEEE Transactions on Reliability, vol. 46, No. 1, Mar. 1997, pp 11-17.*

(Continued)

*Primary Examiner*—Chun Cao
(74) *Attorney, Agent, or Firm*—Paul E. Steiner

(57) ABSTRACT

A method of electing a bootstrap processor from among a plurality of processor includes creating an atomic access shared location and electing one of said processors as the bootstrap processor.

24 Claims, 5 Drawing Sheets

U.S. PATENT DOCUMENTS

| | | | | |
|---|---|---|---|---|
| 5,768,585 | A | 6/1998 | Tetrick et al. | |
| 5,790,850 | A | 8/1998 | Natu | |
| 5,867,702 | A | 2/1999 | Lee | |
| 5,904,733 | A | 5/1999 | Jayakumar | |
| 6,009,521 | A | 12/1999 | Huang | |
| 6,058,475 | A | 5/2000 | McDonald et al. | |
| 6,108,781 | A | 8/2000 | Jayakumar | |
| 6,112,282 | A * | 8/2000 | Lynch | 711/145 |
| 6,158,000 | A | 12/2000 | Collins | |
| 6,247,025 | B1 * | 6/2001 | Bacon | 707/206 |
| 6,385,704 | B1 * | 5/2002 | Rao et al. | 711/151 |
| 6,594,756 | B1 * | 7/2003 | Datta et al. | 713/2 |
| 6,611,911 | B1 * | 8/2003 | O'Shea et al. | 713/1 |
| 6,732,208 | B1 * | 5/2004 | Alsaadi et al. | 710/112 |

OTHER PUBLICATIONS

Sheldon S.L. Chang, "Multiple-Read Single-Write Memory and Its Applications", IEEE Transaction on Computers, vol. C-29. N 28, Aug. 1980, pp 689-694.*

Afk et al., "Optimal Time-Space Tradeoff for Shared Memory Leader Election", Jan. 18, 1999, pp. 1-18.*

* cited by examiner

BOOTSTRAP PROCESSOR ELECTION MECHANISM ON MULTIPLE CLUSTER BUS SYSTEMS

The present patent application is a Continuation of application Ser. No. 09/474,781, filed Dec. 30, 1999 now U.S. Pat. No. 6,611,911.

FIELD OF THE INVENTION

Embodiments of the present invention relate to a bootstrap processor election mechanism for a multi-processor system including multiple processing units or elements. More particularly, embodiments of the present invention relate to a bootstrap processor election mechanism which elects a bootstrap processor among several processors.

BACKGROUND OF THE INVENTION

A multi-processor system, such as a multi-processor computer system, increases system performance by symmetric processing. Symmetric processing is a type of multiprocessing in which any function can be executed by any one processor at any time. For example, a computer system can use four processors that simultaneously perform logical operations, creating a system that is much faster than one with a single processor. A multi-processor system using symmetric processing can also increase system reliability, because when one device fails the remaining devices can keep the system running. In addition, a multi-processor system using symmetric processing can reduce waste by alleviating redundancies in having multiple devices performing the same function.

FIG. 1 shows a known symmetric processing computer system. The system includes multiple processors P0, P1, P2 and P3, labeled 100, 101, 102 and 103, respectively, memory interface 105 and basic input/output system (BIOS) interface 106. Processors 100–103 form a cluster 150. As used herein, the term; cluster; is defined a collection up to four processors interconnected on a single processor bus. As shown in FIG. 1, processor bus 104 interconnects processors 100–103. This shared bus may be referred to a Front Side Bus (FSB).

It is preferred to have a small number of processors (typically 4) on a FSB. As is known, to add additional processors on the FSB adds to congestion and may not contribute to additional system performance.

In symmetric processing systems, the processors share the same FSB, memory and BIOS resources. According to known systems, each cluster is independent of one another and requires its own memory, BIOS, FSB and other processing devices within the cluster.

In some multi-processor computer systems, all processors are started, or; booted,; at one time when the system is turned on. Because of the difficulty in writing control code for computer systems that can be simultaneously executed by multiple processors, however, some multi-processor computer systems often employ mechanisms which only allow one processor to be active in each cluster during the booting process while the other processors remain inactive. This active processor is called the bootstrap processor. From the saying “pull yourself up by your bootstraps,” the term boot refers to a computer system’s start up procedure.

The bootstrap procedure of a single cluster system does not translate to multi-cluster systems. Since each cluster operates independently of the others each cluster would have its own bootstrap processor. However, it is desirable to have a single bootstrap processor operating for the entire system.

It should be noted that although a multi-processor system was used to illustrate the disadvantages of a bootstrap processor assignment mechanism, other types of multi-device systems and bootstrap processor assignment mechanisms suffer from similar problems.

In view of the foregoing, it can be appreciated that a substantial need exists for a bootstrap processor election mechanism which elects a single bootstrap processor among several clusters of processors that maintains the benefit of increased performance in a symmetric multi-processor computer system, at a reasonable cost, without losing the benefits of increased reliability and reduced operational redundancies.

SUMMARY OF THE INVENTION

In accordance with an embodiment of the present invention, a bootstrap processor election mechanism elects a single bootstrap processor among a plurality of processors includes creating an atomic access shared storage location and electing one of the processors as the bootstrap processor.

BRIEF DESCRIPTION OF THE DRAWINGS

In the accompanying drawings, reference characters refer to the same parts throughout the different views.

DETAILED DESCRIPTION

Embodiments of a bootstrap processor election mechanism are described. In the following description, for purposes of explanation, numerous specific details are set forth to provide a thorough understanding of the present invention. It will be obvious, however, to one skilled in the art that the present invention may be practiced without these specific details. In other instances, well known structures and devices are shown in block diagram form. Furthermore, it is readily apparent to one skilled in the art that the specific sequences in which steps are presented and performed are illustrative and it is contemplated that the sequences can be varied and still remain within the spirit and scope of the present invention.

An embodiment of the present invention is directed to a bootstrap processor election mechanism that elects a single bootstrap processor among several a plurality of processors. According to an embodiment of the present invention, software is implemented which can be simultaneously executed by the plurality of processors to elect a single bootstrap processor. In one embodiment of the present invention, an atomic access shared storage location is created using software and a bootstrap processor is elected among the plurality of processors by software using the atomic access shared storage location. In an alternative embodiment of the present invention, the election of the bootstrap processor can also be implemented with an atomic access shared location that is created using hardware components rather than using software.

Figure 1:
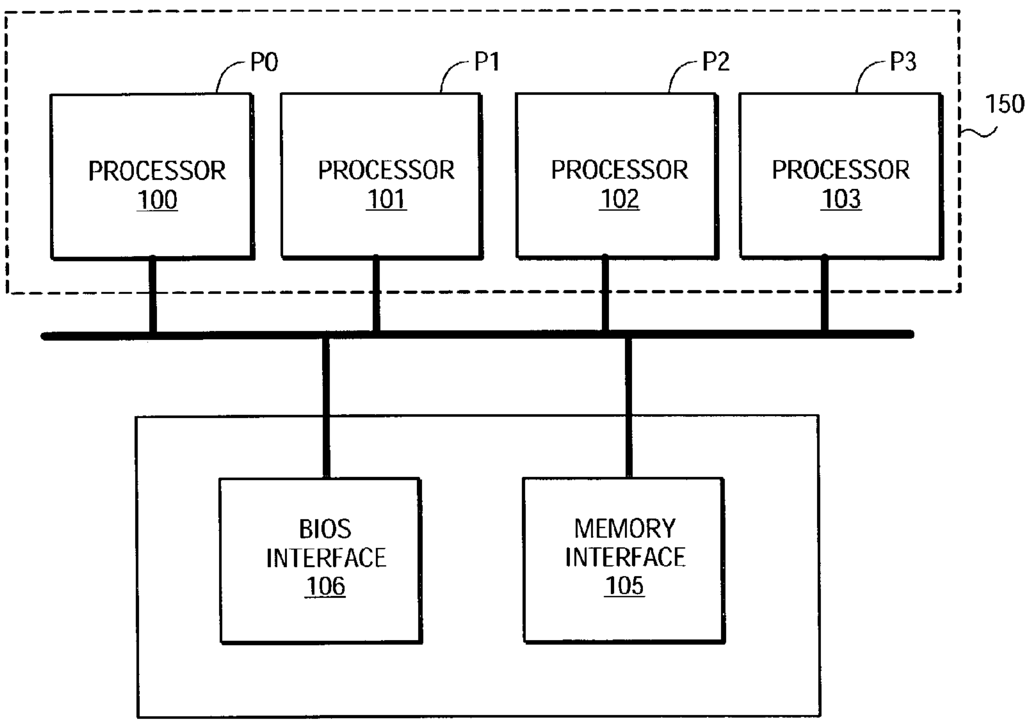
FIG. 1 is a block diagram showing a known symmetric processing computer system.
Figure 2:
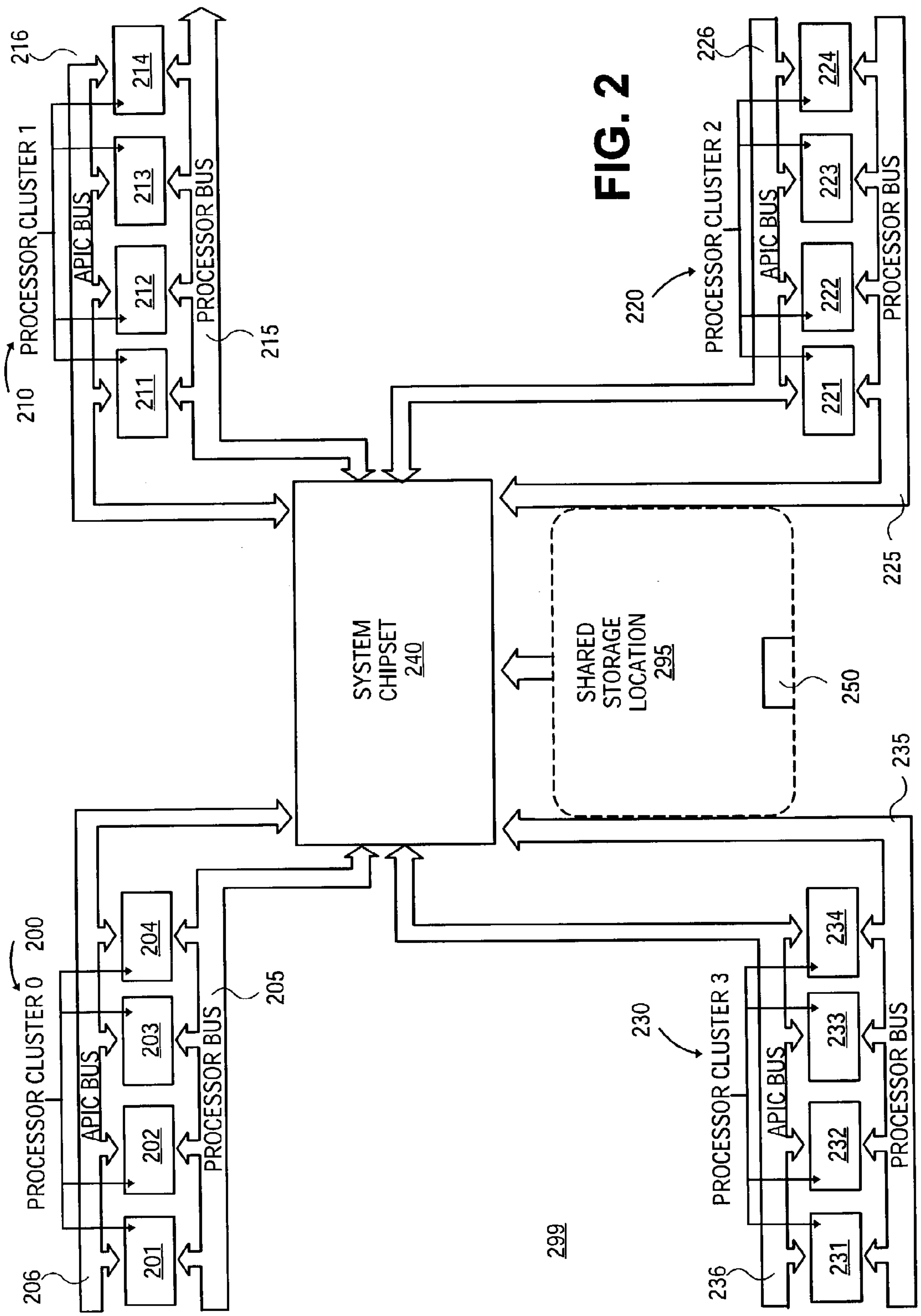
FIG. 2 is a block diagram showing a multi-processor computer system including a bootstrap processor election mechanism according to an embodiment of the present invention.

Referring now in detail to the drawings wherein like parts are designated by like reference numerals throughout, FIG. 2 is a block diagram of a multi-processor computer system 299, including processor clusters 0–3, labeled 200, 210, 220 and 230, respectively, a system chipset 240 and a shared storage location 295 according to one embodiment of the present invention. System 299 also includes processor or front side buses 205, 215, 225 and 235 for coupling each of processor in a cluster to each other and each cluster to chipset 240 and Advanced Programmable Interrupt Controller (APIC) buses 206, 216, 226 and 236, for coupling each of the processors in each of the clusters to chipset 240. The term; coupled; means connected directly or indirectly. APIC buses are used to transmit and receive data such as cluster ID data and APIC ID data from each processor to the system chipset 240.

Software running on multi-processor computer system 299 can be used to selectively enable and disable each of four clusters 200, 210, 220, and 230 each having four processors during system power up or reset. Although this embodiment of the present invention is illustrated with a four-cluster, four-processor system, it will be appreciated that systems with other numbers of clusters and processors may be used instead. In addition, the embodiments of the present invention, can be implemented with software as well as hardware components and combinations thereof as will be described in the following paragraphs.

Shared access location 295 can be any storage location that all of the processors involved in the election process have access to and which when read will return a value written to it and which has a known initial value when the election process begins. The race and electon is carried out by each processor guaranteeing atomic access to the shared access location (i.e., a processor's read and possible write is guaranteed not to conflict with that of another processor). According to an embodiment of the present invention, share storage location 295 may include shared memory, BIOS, I/O and interrupt locations.

According to the present invention, atomic access is created by software running on each of the processors which causes the processors to delay its read of the shared location by a fixed time that is unique from all of the other processors. The time between different processor accesses is also is large enough so that one processor can complete its read and perform a write operation to the shared location prior to the access of the shared location by another processor. The software uses the uniqueness of each processor's identification (ID) to compute an appropriate period of time that is sufficient to guarantee and atomic access relative to the other processors.

In an alternative embodiment of the present invention, atomic access may also be instantiated by unique hardware features of shared storage location 295. In this case, the software as described above need not create atomicity using the unique delay mechanism, since it is supplied innately in shared storage location 295. If the unique hardware features of shared storage location 295 supplies atomicity, but nothing else, then a first mechanism of the election process, as described in detail below, is used. Alternatively, if the hardware additionally supplies the property that only the first write to shared storage location 295 is carried out and further writes to shared storage location 295 are ignored, then a second mechanism of the election process, also described in detail below, is used.

The election of a single bootstrap processor will now be described in detail. The election process according to one embodiment of the present invention is achieved by constructing software code such that each processor can identify itself from the other processors with a unique processor ID despite the fact that each processor may be running the same software. This is accomplished by using innate hardware identification bits in the processors. In an alternative embodiment, a hardware register 250 may be used which returns a different value each time it is read by a different processor. For example, hardware register 250 may be a read access incrementing counter. Each processor then being able to identify itself uniquely, races to take ownership of a token or flag by reading a the shared storage location and writing its own ID to the shared storage location.

According to an embodiment of the present invention, two different mechanisms for electing a bootstrap processor can be used. In the first mechanism, the processor first reads the shared storage location and then writes it unique ID. If the read value is the location's initial value, then the processor is the election winner. If the read value, however, is not the initial value, then the processor is an election loser.

In the second mechanism, the processor writes to shared storage location 295 first and then reads shared storage location 295. Using the second mechanism, the processor is the winner if value read is its own ID, and it is a loser if the read value is not its own ID. This second mechanism is used when the first write to shared storage location 295 is carried out and further writes to shared storage location 295 are ignored.

Referring back to FIG. 2, computer system 299 is initialized via power-on or reset. The shared storage location 295, innately stores a known value X by design, its initialization value. This known value may be stored in the shared BIOS of shared storage location 295. This stored value is known by each of the processors in computer system 299. For example, the stored value can be an indication that a flag or a token is available. In one embodiment of the present invention, this stored value may be changed when a processor reads the stored value and writes a different value in shared storage location 295.

When computer system 299 is turned on or reset, each of the processors is enabled. Each of the processors in the clusters is assigned a unique agent ID at power up time. The unique agent ID may, for example, have 4-bits, two bits which identify which cluster of processors the processor belongs to and two bits which identify the APIC ID or processor number. The APIC ID is a number that is usually assigned to the processor by the manufacture. The unique agent ID is supplied by system chipset 240 and loaded into an APIC ID register of each processor. According to an embodiment of the present invention, the processors in each of clusters 0–3 is assigned processor numbers 0, 1, 2 or 3. Therefore, 16 unique agent IDs for each of the 16 is created. The following table of Unique Agent IDs shows the assignment of the unique agent ID's for each of the processors shown in FIG. 2

UNIQUE AGENT IDS

| Processor Label | Cluster Number | Processor Number | Unique Agent ID |
|---|---|---|---|
| 201 | 00 | 00 | 0000 |
| 202 | 00 | 01 | 0001 |
| 203 | 00 | 10 | 0010 |
| 204 | 00 | 11 | 0011 |
| 211 | 01 | 00 | 0100 |
| 212 | 01 | 01 | 0101 |
| 213 | 01 | 10 | 0110 |
| 214 | 01 | 11 | 0100 |
| 221 | 10 | 00 | 1000 |
| 222 | 10 | 01 | 1001 |
| 223 | 10 | 10 | 1010 |
| 224 | 10 | 11 | 1011 |
| 231 | 11 | 00 | 1100 |
| 232 | 11 | 01 | 1101 |
| 233 | 11 | 10 | 1110 |
| 224 | 11 | 11 | 1111 |

The processors in each of the clusters 200–230, elects a processors to be a candidate for the bootstrap processor election. This election process may include electing the processor with the highest agent ID. Alternatively, the election process may include selecting the processor with the lowest agent ID. Other forms of selecting a candidate bootstrap processor from each of the clusters may be used which do not depart from the spirit of the present invention.

After each cluster has completed election, each of the elected processors determines its unique agent ID by reading its APIC ID register. After the unique agent IDs have been read, each elected processor waits a calculated period of time before reading the value stored in shared storage location 295. According to an embodiment of the present invention, each elected processor waits a different calculated period of time before reading the stored value because the calculated period of time is dependent on the processors unique agent ID. The system is designed such that the time between different elected processors accessing the shared storage location allows a preceding elected processor to finish reading the stored value and performing a write operation to the share memory location unit prior to a subsequent elected processor accessing the shared storage location.

If an elected processor reads the value stored in shared storage location 295, and the value is equal to the initial value X, then this processor is elected the bootstrap processor. Alternatively, if an elected processor reads the value stored in shared storage location 295 and the value is not equal to the initial value X, then the elected processor is not the bootstrap processor. In one embodiment of the present invention, the system is designed such that the first elected processor to read the stored value will be elected the bootstrap processor.

In an alternative embodiment of the present invention, each of the elected processors writes its unique agent ID to shared storage location 295. Only the first elected processor to write its unique agent ID to shared storage location 295 is accepted. Subsequent elected processors can write their unique agent IDs to shared storage location 295, but the value will not change from the unique agent ID of the first elected processor. Afterwards, each elected processor reads the value stored in shared storage location 295. If the stored value is equal to the elected processor's unique agent ID, then the elected processor is elected the bootstrap processor. Alternatively, if the elected processor reads the value stored in shared storage location 295 and the stored value is not equal to the elected processor's agent ID, then the elected processor has not been elected the bootstrap processor.

In accordance with one embodiment of the present invention, instructions for execution are stored on a medium and distributed as software. The medium is any device adapted to store digital information, and correspond to the shared memory location unit 251 of FIG. 2. For example, a medium is a portable magnetic disk, such as a floppy disk; or a Zip® disk, manufactured by Iomega Corporation of Roy Utah; or a Compact Disk Read Only Memory (CD-ROM) as is known in the art for distributing software. The medium is distributed to a user that has a processor suitable for executing instructions adapted to be executed, e.g. processor of computer system 299, etc. The term; adapted to be executed; is meant to encompass any instructions that are ready to be executed in their present form (e.g. machine code) by a processor, or require further manipulation (e.g. compilation, decryption, or provided with an access code, etc.) to be executed by the processor.

Figure 3:
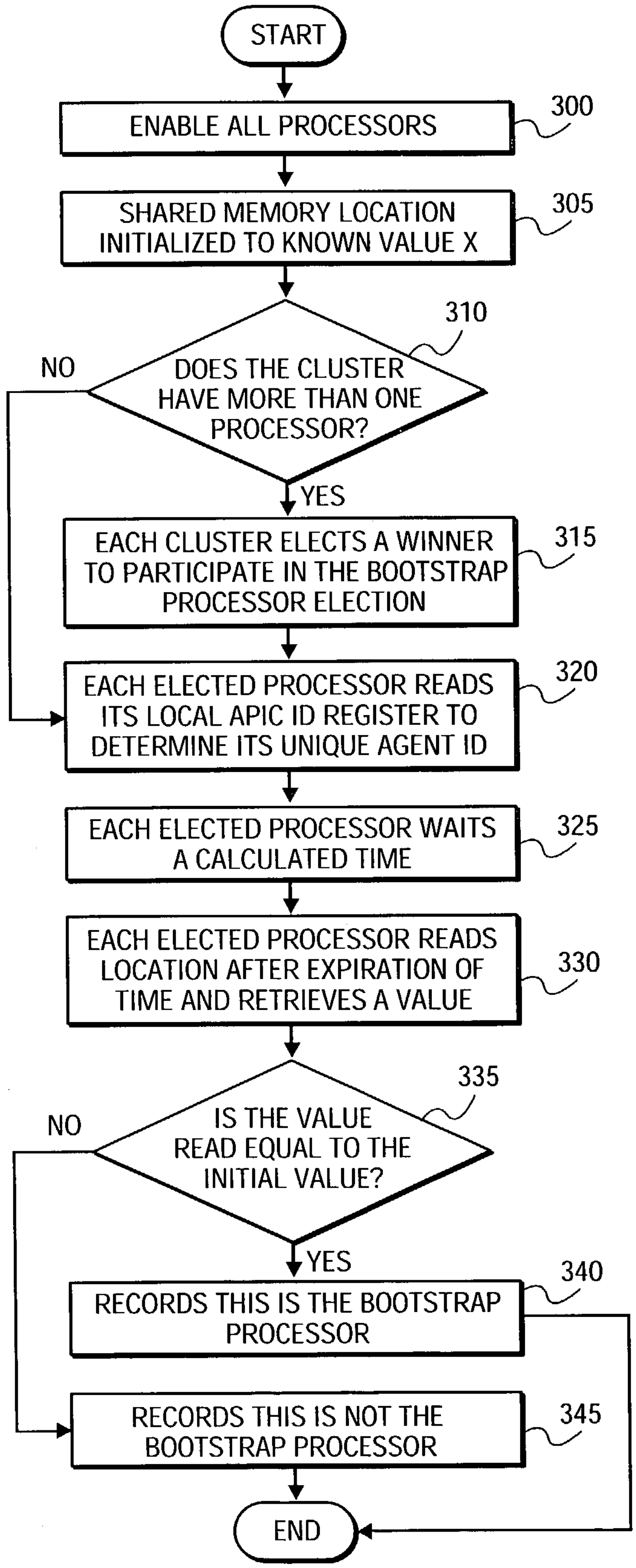
FIG. 3 is a flow diagram of a method for selecting a bootstrap processor in a multi-processor computer system according to an embodiment of the present invention.
Figure 4:
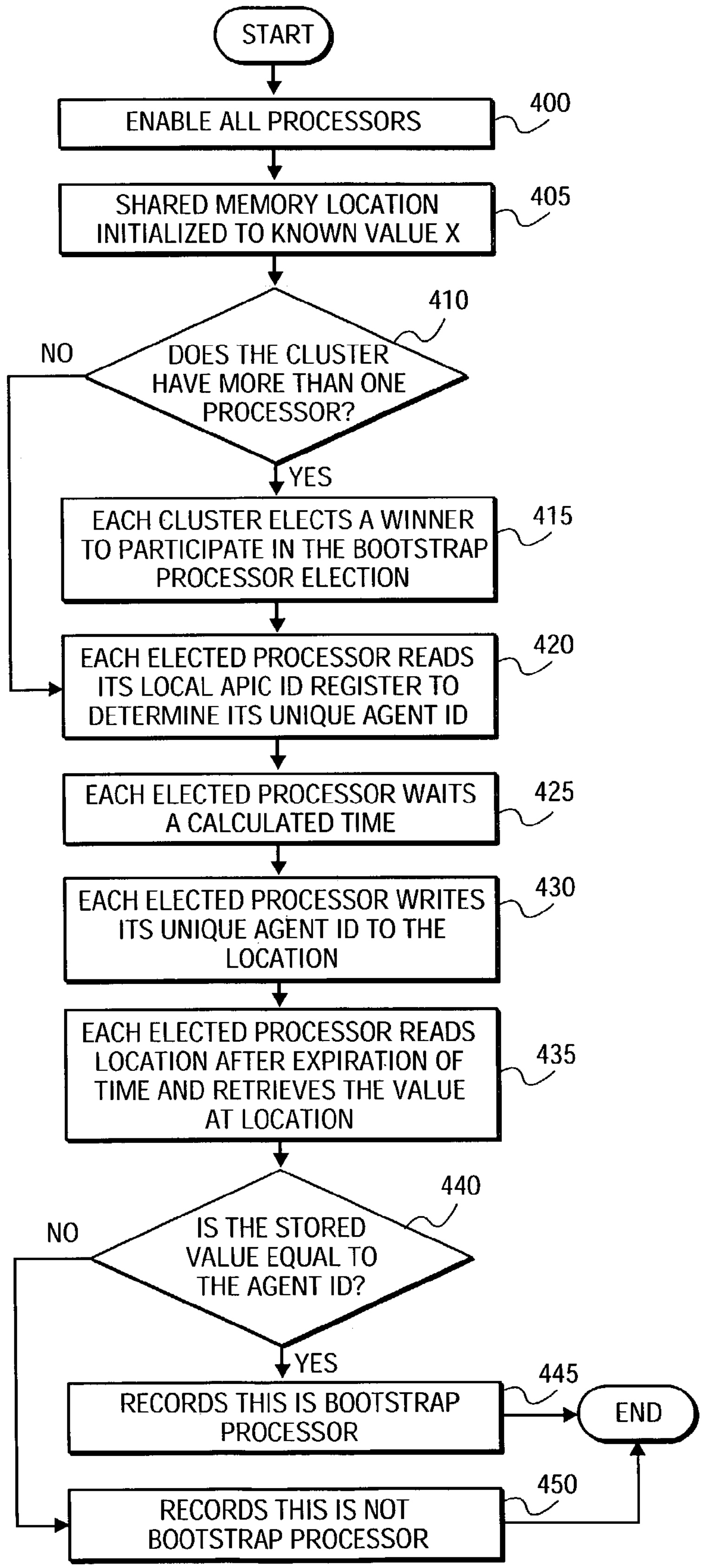
FIG. 4 is a flow diagram of an alternative method for selecting a bootstrap processor in a multi-processor computer system according to an embodiment of the present invention.

FIG. 3 and FIG. 4 show exemplary steps executed in accordance with the first and second mechanisms, respectively, for electing a bootstrap processor according to embodiments of the present invention. Referring now to FIG. 3, when the system is turned on, or reset, all processors in each of the clusters are enabled at 300. At 305, the shared storage location is initialized to known value X. This value can be predetermined from the BIOS.

If there is only one processor in a cluster at 310, this processor automatically becomes the elected processor and proceeds to 320. Alternatively, if there are more than one processor in a cluster, at 310, each cluster elects a candidate processor to be assigned the bootstrap processor for the entire system at 315. This election process includes the processors in each cluster negotiating among themselves before the first instruction is fetched from memory to determine which will be the bootstrap processor. This negotiation process is not performed on the front processor bus. Rather, it is performed over an Advanced Programmable Interrupt Controller (APIC) bus. As stated above, a single processor in a cluster need not perform this election process and automatically goes to 320.

After each cluster has selected an elected processor, each of the elected processors reads its local API ID register to determine its unique agent ID at 320.

Once each processor reads its local APIC ID register, each processor waits a time calculated as $T=(N-ID)*C$ at 325, where ID is the unique agent ID of the processor, and N is the maximum number of processors in the system. C, a constant, is chosen depending on the type of processors used in the system. For example, C can have the value 1 second. The time T can alternatively be calculated by the equation, $T=1/ID*C$ Each of the processors must use either one or the other equation to calculate the value for T.

At 330, each elected processor reads the value stored in shared memory location 251 after the expiration of its time T. Each elected processor reads the stored value and replaces the stored value with a value other than the initial value. According to an embodiment of the present invention, the first processor to read the stored value will be elected the bootstrap processor because the value read by this elected processor will be initial value at 335. The first elected processor is determined by the T value that was calculated using the elected processors unique agent ID. The subsequent elected processors read the shared memory location at a later time than the first elected processor because their T values are larger that the T value of the first processor. Thus, their read times will follow that of the first elected processor, or bootstrap processor. The bootstrap processor writes in its memory that it has been selected the bootstrap processor at 340, so that election processor will not have to be repeated.

If the value stored in shared storage location 295 is not equal to the initial value, then each of the subsequent elected processors knows that it has not been selected as the bootstrap processor because value read in the shared storage location 295 is not the initial value. Thus, each of the subsequent elected processors reads the stored value (which is not the initial value because the shared storage location 295 has been accessed by the first elected processor) and changes the stored value. The subsequent processors record in their local memory at 345 that they have not been selected the bootstrap processor so that the election process does not have to be repeated.

FIG. 4 is a flow diagram of an alternative method for selecting a bootstrap processor in a multi-processor system according to an embodiment of the present invention. Steps 400–425 parallel steps 300–325 of FIG. 3 and do not require any further explanation. At 430, each elected processor writes its unique agent ID to shared storage location 295. Only the first processor to write its agent ID to shared storage location will be accepted. Although not known to any subsequent elected processor that writes to shared storage location 295, all subsequent writes to this shared memory location will not be accepted. Thus, the first processor to write its unique agent ID will become the bootstrap processor. The first elected processor to write its unique agent ID is determined by the T value calculated using its unique agent ID. The subsequent elected processors writing their unique agent IDs to the share memory location will write at a later time than the first elected processor because their T values are larger that the T value of the first elected processor.

Once each of the elected processor writes its agent ID to the shared memory location, each elected processors reads the value stored in the shared memory location at 435.

At 440, if read value is equal to the elected processor's unique agent ID, then this elected processor is the bootstrap processor for the entire system. According to an embodiment of the present invention, the first elected processor to read the stored value will be the elected as the bootstrap processor because the value read by this processor will be initial its unique agent ID. At 445, the bootstrap processor writes in memory that it has been selected as the bootstrap processor so that election processor will not have to be repeated.

If the value stored in shared storage location 295 is not equal to the initial value, then each of the subsequent elected processors knows that they have not been elected the bootstrap processor. At 450, each of the subsequent elected processors records in their local memory that they have not been selected the bootstrap processor so that the election process does not have to be repeated.

Figure 5:
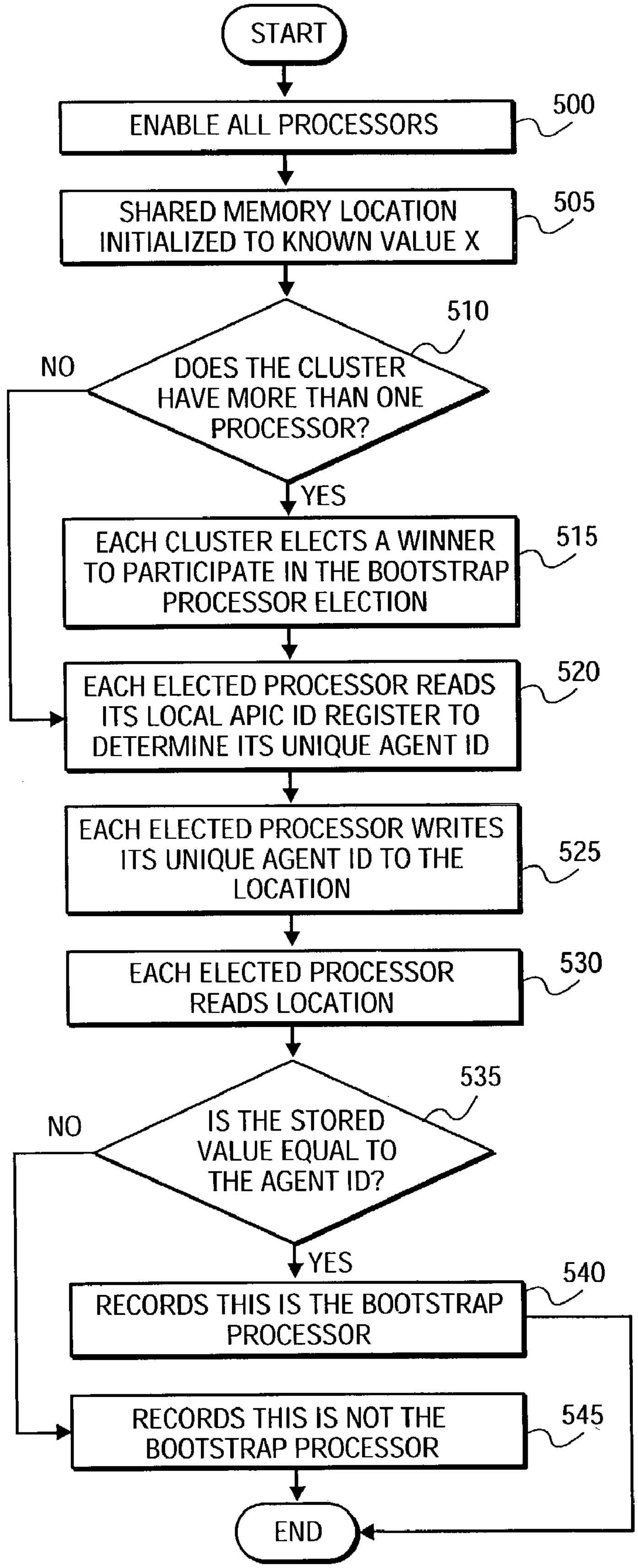
FIG. 5 is a flow diagram of an alternative method for selection a bootstrap processor in a multi-processor computer system according to an embodiment of the present invention.

Referring now to FIG. 5 which illustrates an alternative embodiment of the present invention when the election of the bootstrap processor is implemented with an atomic access shared location that is created using hardware components rather than using software. Steps 500–520 parallel steps 400–420 of FIG. 4 and do not require any further explanation. At 525, each elected processor writes its unique agent ID to shared storage location 295. At 530, each processor reads shared storage location 295. According to an embodiment of the present invention, shared storage location 295 includes the feature of only accepting the first write value after power on or reset. Thus if multiple writes occur, only the first write is accepted.

At 535, if read value is equal to the elected processor's unique agent ID, then this elected processor is the bootstrap processor for the entire system. According to an embodiment of the present invention, the first elected processor to read the stored value will be the elected as the bootstrap processor because the value read by this processor will be initial its unique agent ID. At 540, the bootstrap processor writes in memory that it has been selected as the bootstrap processor so that election processor will not have to be repeated.

If the value stored in shared storage location 295 is not equal to the initial value, then each of the subsequent elected processors knows that they have not been elected the bootstrap processor. At 545, each of the subsequent elected processors records in their local memory that they have not been selected the bootstrap processor so that the election process does not have to be repeated.

The advantage of this bootstrap processor election mechanism is that it provides a single bootstrap processor for the entire system instead of a bootstrap processor for each main or front bus. The simplicity of this design makes it a very cost effective solution for a multi-processor system by interconnecting each of the processors in the system and providing shared resources for the interconnected processors. Shared resources include an atomic access shared storage location, a shared memory location, a shared BIOS location, a shared I/O location and a shared interrupt location. Any multi-processor system can take advantage of this type of bootstrap processor election mechanism.

Although various embodiments are specifically illustrated and described herein, it will be appreciated that modifications and variations of the present invention are covered by the above teachings and within the purview of the appended claims without departing from the spirit and intended scope of the invention. For example, although an atomic access shared storage location with a share memory, BIOS, I/O, and interrupt location was used to illustrate the bootstrap processor election mechanism for a four-cluster, four-processor system, it will be appreciated that other shared resources for systems having other numbers of clusters and processors could also fall within the scope of the invention. Moreover, although a multi-processor system was used to illustrate the bootstrap processor election mechanism, a bootstrap processor election mechanism for any multi-device system could similarly fall within the scope of the invention.

What is claimed is:

1. A method, comprising:

providing a plurality of processors;

providing a storage location shared by the plurality of processors;

assigning a read time for each of the processors to read the value of the shared storage location;

reading the value of the shared storage location by each of the processors and writing the value of the shared storage location by at least one of the processors; and electing one of the processors as a bootstrap processor in accordance with a value stored in the shared storage location.

2. The method as recited in claim 1, wherein each read time assigned to the respective processors is different from each other read time.

3. The method as recited in claim 2, further comprising providing a unique identification for each of the processors, and wherein the read time for each processor is determined in accordance the unique identification of the processor.

4. The method as recited in claim 3, wherein the read time is determined in accordance with the equation T=(N−ID)*C, where ID corresponds to the unique identification, N corresponds to a number of processors, C corresponds to a constant, and T corresponds to the read time.

5. The method as recited in claim 3, wherein the read time is determined in accordance with the equation T=(1/ID)*C, where ID corresponds to the unique identification, C corresponds to a constant, and T corresponds to the read time.

6. A method, comprising:

providing a plurality of processors;

providing a storage location shared by the plurality of processors;

providing atomic access to the shared storage location; and electing one of the processors as a bootstrap processor in accordance with a value stored in the shared storage location, wherein the plurality of processors comprises at least two different groups of processors.

7. The method as recited in claim 6, further comprising:

selecting a plurality of candidate processors from the different groups of processors, with one candidate processor coming from each group; and electing one of the candidate processors as the elected bootstrap processor in accordance with the value of the shared storage location.

8. A method, comprising:

providing a plurality of processors;

providing a storage location shared by the plurality of processors;

delaying each processor by a different period of wait time during boot before accessing the shared storage location; and electing one of the processors as a bootstrap processor in accordance with a value stored in the shared storage location.

9. The method as recited in claim 8, further comprising providing a unique identification for each of the processors, and wherein the wait time for each processor is determined in accordance the unique identification of the processor.

10. The method as recited in claim 9, wherein the wait time is determined in accordance with the equation T=(N−ID)*C, where ID corresponds to the unique identification, N corresponds to a number of processors, C corresponds to a constant, and T corresponds to the wait time.

11. The method as recited in claim 10, wherein the wait time is determined in accordance with the equation T=(1/ID)*C, where ID corresponds to the unique identification, C corresponds to a constant, and T corresponds to the wait time.

12. The method as recited in claim 8, wherein the plurality of processors comprises at least two different groups of processors.

13. The method as recited in claim 12, further comprising:

selecting a plurality of candidate processors from the different groups of processors, with one candidate processor coming from each group; and electing one of the candidate processors as the elected bootstrap processor in accordance with the value of the shared storage location.

14. A system, comprising:

a plurality of processors; and a storage location shared by the plurality of processors, wherein each processor is adapted to wait a different period of time during boot to access the shared storage location, and wherein one of the processors is elected as a bootstrap processor in accordance with a value stored in the shared storage location.

15. The system as recited in claim 14, wherein the system is adapted to provide atomic access to the shared storage location.

16. The system as recited in claim 14, wherein a unique identification is associated with each of the processors, and wherein the wait time for each processor is determined in accordance the unique identification of the processor.

17. The system as recited in claim 16, wherein the wait time is determined in accordance with the equation T=(N−ID)*C, where ID corresponds to the unique identification, N corresponds to a number of processors, C corresponds to a constant, and T corresponds to the wait time.

18. The system as recited in claim 16, wherein the wait time is determined in accordance with the equation T=(1/ID)*C, where ID corresponds to the unique identification, C corresponds to a constant, and T corresponds to the wait time.

19. The system as recited in claim 14, wherein the plurality of processors comprises at least two different groups of processors.

20. The method as recited in claim 19, wherein each group of processors is adapted to select a candidate processor for the group and the elected bootstrap processor is elected from the candidate processors from each group.

21. An article of manufacture, comprising a computer-readable medium having stored thereon instructions adapted to be executed by a processor, the instructions, when executed, comprising:

identifying a storage location shared by the processor with a plurality of other processors;

delaying the processor by a period of wait time during boot before accessing the shared storage location; and electing the processor as a bootstrap processor in accordance with a value of the shared storage location.

22. The article as recited in claim 21, including further instructions when executed, comprising:

providing a unique identification for the processor, wherein the wait time for the processor is determined in accordance the unique identification of the processor.

23. The article as recited in claim 22, wherein the wait time is determined in accordance with the equation T=(N−ID)*C, where ID correspond to the unique identification, N corresponds to a number of processors, C corresponds to a constant, and T corresponds to the wait time.

24. The article as recited in claim 22, wherein the wait time is determined in accordance with the equation T=(1/ID)*C, where ID corresponds to the unique identification, C corresponds to a constant, and T corresponds to the wait time.

* * * * *